Patented Sept. 15, 1936

2,054,770

UNITED STATES PATENT OFFICE 2,054,770

WELDING IRON, STEEL, AND ALLOYS OF IRON OR STEEL

Kurt Kautz, Essen, Germany, assignor to Fried. Krupp Aktiengesellschaft, Essen-on-the-Ruhr, Germany No Drawing. Application September 28, 1931, Serial No. 565,697. In Germany October 4, 1930

7 Claims. (Cl. 219—10)

It is well known that welded pieces of low carbon steel in which the weld is formed by the use of a welding rod of substantially the same or similar composition as that of the material to be welded together, exhibit but little elongation and working capacity (elongation×tensile strength).

The subject matter of the present invention relates to the welding of material especially such as in the welded state is adapted to be exposed to active strains, said material being constituted of iron, steel, and alloys of iron or steel (other than chrome nickel steel alloys having a stable surface), to wit, ferrous material of this type generally, including ingot iron, gray cast iron, cast steel, high silicon steel castings, structural steel and the like in which welding rods which have the composition of the well known chrome nickel steel alloys having a stable surface are used for welding together iron or steel the composition of which differs from that of these welding rods. When such welding rod material is interposed between sections of iron or steel of the type referred to and the said ferrous sections are then welded together through a seam of said interposed chrome nickel steel material, the welded seams produced are remarkable for extraordinarily high elongation, strength and high working capacity. The welding rods as used according to the invention may contain, for example, 10 to 30% chrome and 6 to 30% nickel with or without other alloying components (for instance tungsten, molybdenum, titanium, vanadium, beryllium, and so forth). Using welding rods of approximately 25% chrome, 20% nickel, and 0.15% carbon for welding boiler plates of 14 mm. in thickness, bending angles along the welding seam of 180° were consistently attained, whereas when using welding rods of ingot iron, angles of only about 20° to 30° were attained. In tensile tests of the welds produced with the aforesaid welding rods, no break occurred in the welded seam. The invention is of especial importance, for example, for the welding of vessels for high pressures and temperatures and for structural steel work.

I claim:

1. In welding ferrous sections which in the welded state are adapted to be exposed to active strains, said sections being constituted of iron, steel, or alloys of iron or steel other than chrome nickel steel alloys having a stable surface and chrome iron alloys containing 10% or more of chromium, the improvement which consists in interposing between the sections to be welded welding rod material constituted of a chrome nickel steel alloy having a stable surface and welding together the ferrous sections through said interposed chrome nickel steel material.

2. In welding ferrous material other than chrome nickel steel alloys having a stable surface and chrome iron alloys containing 10% or more of chromium, the improvement which consists in interposing between the sections to be welded welding rod material constituted of a chrome nickel steel alloy having a stable surface and containing approximately 10 to 30% chrome and 6 to 30% nickel and welding together the ferrous sections through said interposed chrome nickel steel material.

3. In welding ferrous material other than chrome nickel steel alloys having a stable surface and chrome iron alloys containing 10% or more of chromium, the improvement which consists in interposing between the sections to be welded welding rod material constituted of a chrome nickel steel alloy having a stable surface and containing approximately 25% chrome, 20% nickel and 0.15% carbon and welding together the ferrous sections through said interposed chrome nickel steel material.

4. The method of producing welded articles which consists in exposing to a welding temperature and welding conditions rods of chrome nickel steel alloys having a stable surface in the presence of adjacently situated ferrous material other than chrome nickel steel alloys having a stable surface and chrome iron alloys containing 10% or more of chromium and producing a welded seam where the ferrous material is welded together, said seam being characterized by high elongation, strength, and high working capacity.

5. Welded ferrous articles composed of ferrous material other than chrome nickel steel alloys having a stable surface and chrome iron alloys containing 10% or more of chromium, said articles having a welding seam where the individual sections of said ferrous articles are welded together, said seam possessing high elongation, strength and high working capacity and consisting of a chrome nickel steel alloy having a stable surface welded together with the said ferrous sections in the seam.

6. Welded articles such as set forth in claim 5 in which the chrome nickel steel alloy having a stable surface is one containing 10 to 30% chrome and 6 to 30% nickel.

7. Welded articles such as set forth in claim 5 in which the chrome nickel steel alloy having a stable surface is one containing about 25% chrome, 20% nickel and 0.15% carbon.

KURT KAUTZ.